3,286,213
PRESSURE TRANSDUCER
Yao T. Li, South Lincoln, Mass.
(40 Ames St., Cambridge, Mass.)
Filed July 8, 1964, Ser. No. 381,204
9 Claims. (Cl. 338—42)

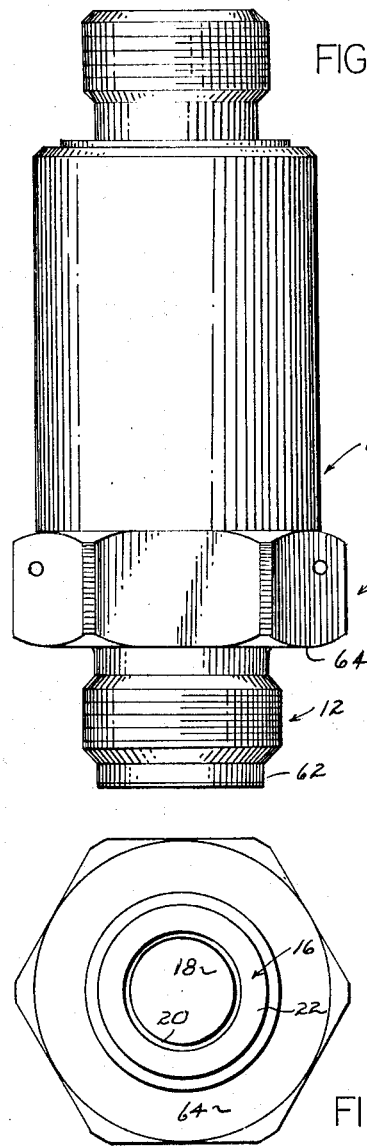
FIG.1
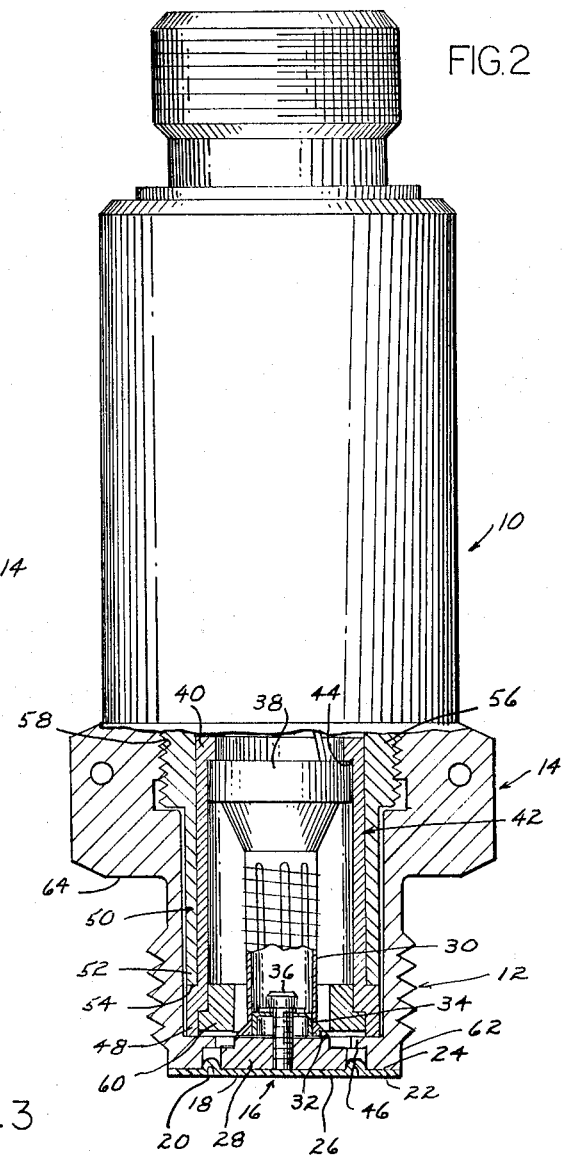
FIG.2
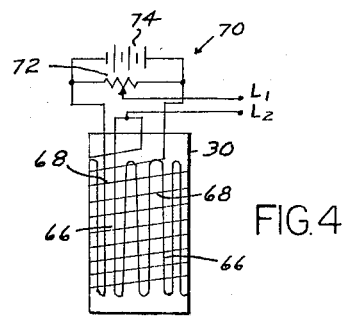
FIG.3
FIG.4
INVENTOR
YAO T. LI
BY,
Wolf, Greenfield + Hicken
ATTORNEYS

United States Patent Office 3,286,213
Patented Nov. 15, 1966

This invention relates to pressure transducers and more particularly comprises a new and improved pressure transducer capable of measuring pressures of a high order. This application is a continuation-in-part of my copending application Serial No. 239,418 filed November 23, 1962, now Patent No. 3,234,795. That application in turn is a division of my copending application Serial No. 829,857, filed July 27, 1959, now Patent No. 3,138,027.

Diaphragms are commonly used today as pressure sensing elements or pickups in gages particularly designed to measure high pressures; that is, pressures in the order of 10,000 pounds per square inch (p.s.i.). For the same maximum stress, the diameter of the diaphragms used as the pressure pickups must increase with increases in the intended pressure range to obtain a given diaphragm deflection. The increased diaphragm diameter effects a greater volumetric displacement of the liquid medium whose pressure is being measured. The greater volumetric displacement of the liquid in turn causes a greater disturbance of the hydraulic system and an intolerable amount of energy may be withdrawn from the liquid as a result of its displacement. The volumetric displacement of the liquid medium becomes more critical when the volume of the medium is relatively small.

A common application of gages of the type which I have invented is the measurement of pressure of hydraulic oil in a servo valve. In such a setting, the hydraulic oil may have a volume of but a few cubic centimeters. As the energy withdrawn from a liquid is proportional to its change in volume, a change in the volume of the oil of even .01 cubic centimeters may be more than the hydraulic system can withstand. Thus, it will be appreciated that gages having relatively large diameter diaphragms as sensing elements are often unacceptable.

One important object of this invention is to avoid the necessity of increasing the diameters of sensing diaphragms when measuring pressures of a high order. By permitting the use of small diaphragms even when the pressures being measured are extremely high, the loss of excessive amounts of energy is avoided in the liquid medium whose pressure is being measured.

Another important object of this invention is to provide a diaphragm-type pressure transducer having diaphragm displacement restraining means which is relatively insensitive to variations in temperature.

Another importan object of this invention is to provide a pressure transducer having a strain tube which is mechanically shielded from extremely high temperatures and which does not require special liquid coolants.

Still another important object of this invention is to eliminate diaphragm deflection which is sometimes caused by stresses applied to the frame of the transducer when mounted in place in a wall of a chamber containing the media whose pressure is to be measured.

To accomplish these and other objects the transducer of the present invention includes a frame which is externally threaded at one end and open at that end. A diaphragm is welded at its periphery to the open end of the frame, and a strain tube is disposed within the frame and is connected to the central portion of the diaphragm. A relatively stiff strain tube holder is also mounted within the frame and is spaced from and surrounds the strain tube. The holder anchors the strain tube to the frame at a location closely adjacent the periphery of the diaphragm. A number of strain windings are secured to the strain tube and respond to distortions of the tube resulting from diaphragm displacement.

These and other objects and features of this invention, along with its incident advantages, will be better understood and appreciated from the following detailed description of one embodiment thereof, selected for purposes of illustration, and shown in the accompanying drawings, in which:

FIG. 1 is a side view of a pressure transducer conducted in accordance with this invention;

FIG. 2 is a side view partly in section of the transducer shown in FIG. 1;

FIG. 3 is an end view of the diaphragm end of the transducer shown in FIG. 1; and FIG. 4 is a schematic diagram of a signal generator of the embodiment of FIG. 1.

The embodiment of this invention shown in the drawing includes a frame 10 which is generally cylindrical in shape and having a lower externally threaded section 12 and a somewhat enlarged central portion 14 provided with an hexagonal grip to facilitate the use of a wrench to anchor the frame 10 in the wall of a chamber containing a medium whose pressure is to be measured. The frame 10 is closed at its lower end by a diaphragm 16 made of thin and flexible material having a flat central circular section 18 and a surrounding annular dished portion 20. The periphery 22 of the diaphragm is welded to the lower face 24 of the frame 10.

In response to externally applied forces to the outer face of the diaphragm 16, the diaphragm displaces axially relative to the frame 10. As the effective area of the diaphragm remains substantially constant throughout the range of deflection permitted, the diaphragm displacement is proportional to the force applied to it.

The flat central portion 18 of the diaphragm 16 is welded to the lower face 26 of a force summing button or circular plate 28 disposed within the frame 10 on the inner side of the diaphragm. A strain tube 30 is disposed within the frame 10, and its foot or enlarged end 32 is welded to a rigid cup-shaped member 34. The cup-shaped member 34 in turn is connected to the force summing plate 28 by a small screw 36 which is clearly evident in FIG. 2. The screw 36 is used to connect the strain tube to the force summing plate, rather than relying upon a press fit or other similar expedient to connect the plate and tube.

The strain tube 30 extends inwardly from the plate 28 and is joined at its inner end 38 to the inner end 40 of strain tube holder 42. The inner end 40 of the strain tube holder 42 is provided with a shoulder 44 which bears against the enlarged inner end 38 of the strain tube to prevent the inner end of the tube from displacing axially in the frame 10. The strain tube holder 42 extends from the shoulder 44 in the direction of the diaphragm 16 to inwardly extending flange 46 provided on the inner surface of the frame 10, immediately inwardly of the diaphragm 16. The outer end 48 of the strain tube holder bears against the flange 46 and is retained in place on the flange by hold-down sleeve 50. The sleeve 50 may be threaded or otherwise secured to the inner surface of the frame 10 at the region of the wrench grip 14. The lower end 52 of the hold-down sleeve bears against shoulder 54 of the holder to lock the end 48 of the strain tube holder on the flange 46. In FIG. 2 the hold-down sleeve 50 is shown provided with an enlarged collar 56 which is externally threaded and screwed into the internally threaded portion 58 of the inner wall of the frame 10.

A safety stop 60 is shown carried on the end 48 of the strain tube holder, which stop cooperates with the inner surface of the force summing plate 28 to limit displacement of the diaphragm. Thus, if a force is applied to the diaphragm 16 which exceeds the maximum rated load of the strain tube 30, the safety stop 60 will nevertheless prevent rupture of the tube and diaphragm by limiting diaphragm deflection.

The strain tube 30 and the strain tube holder 42 are preferably made of the same material so that each has the same coefficient of expansion. Because the strain tube 30 and the holder 42 are of the same effective length, each will experience the same change in effective length in response to changes in their temperatures. It will be noted in FIG. 2 that the inner face of flange 46 and the inner surface of the force summing plate 28 are substantially coplanar and support the outer ends of the holder and strain tube in alignment. The other ends of the tube and holder are aligned at the shoulder 44. Therefore, elongation of the strain tube 30 in response to an increase in its temperature will be accompanied by a corresponding increase in length of the holder 42 from the shoulder 44 so that the shoulder 44 will not act upon the strain tube to apply an extraneous force upon the force summing plate 28, which when united cause displacement of the diaphragm 16.

In FIG. 2 it will be noted that the flange 46 is substantially at the plane of the lowermost thread of the threaded portion 12 of the frame, and the flange 46 is in close proximity to the periphery of the diaphragm 16. Further, the lowermost end of the frame is not threaded but rather is provided with a thread lead portion 62. Because the diaphragm and the strain tube holder are anchored to the frame very close to one another, there will be no relative displacement or deformation of the frame between the diaphragm and the strain tube holder when the frame is screwed tightly into the wall of the chamber containing the medium whose pressure is to be measured. That is, when the frame is torqued tightly into the chamber wall and the lower face 64 of the enlarged hexagonal wrench grip engages the outer face of the wall, the threaded portion of the frame may be stretched, but this will not place upon the diaphragm any extraneous loads for no stretching will occur between the flange 46 and the diaphragm periphery.

In FIGS. 2 and 4 the strain tube 30 is shown to carry longitudinally and circumferentially extending strain windings 66 and 68 respectively. The windings 66 and 68 are stretched and relaxed in response to the deformation of the strain tube. That is, deflection of the diaphragm 16 under the influence of pressure applied to it is reflected in a compression of the strain tube 30, and its change in shape is sensed by the bonded windings 66 and 68. The windings 66 and 68 are connected in a bridge circuit 70 which also includes a balancing bridge resistor 72 and a power source 74. The output signal is measured across the terminals L1 and L2. Terminal L1 is connected to the center tap of the balancing bridge resistor 72, while terminal L2 is connected to the junction between the longitudinal and circumferential windings 66 and 68.

Having described in general terms the various parts of the gage, the manner in which they function in response to an applied pressure sensed by the device and cooperate with one another to render a pressure measurement will now be described. In use, the frame 10 is screwed tightly into the wall of a chamber containing the medium whose pressure is to be measured, by means of the threaded section 12 of the frame. In order to avoid any leakage of the medium, the frame should be tightly screwed into the wall, which may cause the threaded portion 12 to stretch as the frame is torqued in the wall. In response to the pressure of the medium, the diaphragm 16 will displace inwardly, and the displacement will be resisted by the strain tube 30 which provides substantially the entire restraining force on the diaphragm. The inner end 38 of the strain tube is resisted by the shoulder 44 in the strain tube holder 42, and the strain tube will distort to change the resistive character of the longitudinal and circumferential windings 66 and 68. By means of the circuit 70, the distortion of the tube is indicated at a remote location. The safety stop 60 prevents overloading of the strain tube.

From the foregoing description the numerous advantages of the present invention should be appreciated. As pointed out above, because the strain tube and holder are made of the same material and are of the same effective length, no relative displacement will occur between the tube and holder in response to a change in temperature, so that the elastic restraint exerted upon the diaphragm by the tube remains constant. The torque tube holder 42 as well as the hold-down sleeve 50 serve to shield the strain tube 30 to avoid or minimize thermal shocks upon the system. Because the strain tube holder is anchored to the frame very closely adjacent the diaphragm 16 and at the lower end of the threads 12, no relative displacement occurs, between the diaphragm and the location where the strain tube holder is anchored to the frame, and consequently no extraneous loads are applied to the diaphragm as the result of stretching of the frame. Because of the lightness of the strain tube 30 and the minimum size of the force summing plate 28, cup 34 and screw 36, the transducer has a high natural resonant frequency. If the holder 42 was flexible like the strain tube or if the holder was flexible and the strain tube 30 was rigid and the windings were carried by the holder 42, the device would have a substantially lower natural resonant frequency.

From the foregoing description those skilled in the art will appreciate that numerous modifications may be made of this invention without departing from its spirit. Therefore, it is not intended to limit the breadth of this invention to the single embodiment illustrated and described. Rather, it is intended that the scope of this invention be determined by the appended claims and their equivalents.

What is claimed is:

1. A pressure transducer comprising
a frame open at one end and threaded externally at that end,
a diaphragm extending across the end of the frame and closing that end, said diaphragm having a flat central portion and a surrounding dished annular portion,
a force summing button secured to the flat central portion of the diaphragm,
a cylindrical strain tube disposed in the frame and secured at one end to the button, said strain tube carrying a plurality of strain gage windings,
a cylindrical nondeformable strain tube holder coextensive with and surrounding the strain tube and terminating at one end adjacent the button, said end of the holder being secured to the frame,
and means connecting the other end of the tube to the other end of the holder.

2. A pressure transducer comprising
a frame externally threaded at one end and open at that end,
a diaphragm welded at its periphery to the open end of the frame,
a strain tube disposed within the frame and connected to the central portion of the diaphragm,
a nondeformable strain tube holder spaced from and surrounding the strain tube and anchored at one end to the frame closely adjacent the periphery of the diaphragm,
means connecting the other ends of the holder and tube together inwardly of the threaded end of the frame,
and strain windings secured to the tube and responsive to the distortions of the tube in response to displacement of the diaphragm.

3. A pressure transducer comprising,
a cylindrical frame, open at one end,
a diaphragm welded to and closing that end of the frame,
inner and outer substantially coextensive cylindrical members disposed in the frame for restraining displacement of the diaphragm relative to the frame,
means connecting together the ends of the members remote from the diaphragm,
means connecting the other end of the inner cylindrical member to the diaphragm and the other end of the outer cylindrical member to the frame,
said outer cylindrical member having greater stiffness than the inner cylindrical member to confine all distortion of the inner member to said inner member in response to diaphragm deflection,
and strain windings connected to the inner of the members responding to its distortion.

4. A pressure transducer as defined in claim 3 further characterized by
threads provided on the outer surface of the frame just beyond the open end,
said outer cylindrical member being connected to the frame at the end of the threads adjacent the open end of the frame.

5. A pressure transducer as defined in claim 4 further characterized by
said diaphragm having a flat central portion and an annular dished portion,
and a force summing button secured to the flat central portion and joining the inner cylindrical member at the diaphragm.

6. A pressure transducer as defined in claim 5 further characterized by
a cup-shaped member welded to the outer end of the inner cylindrical member,
and a screw secured to the cup-shaped member and threaded into the button for joining the diaphragm and the inner member.

7. A pressure transducer comprising,
a cylindrical frame, open at one end,
a diaphragm welded to and closing that end of the frame,
inner and outer substantially coextensive cylindrical members disposed in the frame for restraining displacement of the diaphragm relative to the frame,
means connecting together the ends of the members remote from the diaphragm for restraining said inner cylindrical member against axial displacement at said remote end,
force summing means connecting the other end of the inner cylindrical member to the diaphragm and means connecting the other end of the outer cylindrical member to the frame,
said outer cylindrical member having a stiffness at least as great as the stiffness of the inner cylindrical member,
and strain windings connected to the inner of the members responding to its distortion.

8. A pressure transducer comprising,
a frame open at one end,
a diaphragm connected at its periphery to the open end of the frame,
a strain tube disposed within the frame and connected to the central portion of the diaphragm,
a nondeformable strain tube holder spaced from and surrounding the strain tube and anchored at one end to the frame closely adjacent the periphery of the diaphragm,
means connecting the other end of the holder and tube together inwardly of said one open end of the frame,
and strain windings secured to the tube and responsive to distortions of the tube in response to displacement of the diaphragm.

9. A pressure transducer in accordance with claim 8 wherein said strain tube is connected to the central portion of the diaphragm through a force summing button.

References Cited by the Examiner
UNITED STATES PATENTS

| | | | |
|---|---|---|---|
| 2,472,045 | 5/1949 | Gibbons | 73—398 |
| 2,509,421 | 5/1950 | Carter | 73—398 |
| 2,627,749 | 2/1953 | Li | 338—4 X |
| 2,940,313 | 6/1960 | Li | 338—36 X |

RICHARD M. WOOD, *Primary Examiner.*

W. D. BROOKS, *Assistant Examiner.*